United States Patent Office

3,406,145
Patented Oct. 15, 1968

3,406,145
HEAT STABILITY OF ACRYLONITRILE POLYMER PRODUCTS
John H. Hennes, Newport News, Va., assignor to The Dow Chemical Company, Midland, Mich., a corporation of Delaware
No Drawing. Filed June 21, 1965, Ser. No. 465,715
17 Claims. (Cl. 260—45.75)

ABSTRACT OF THE DISCLOSURE

Acrylonitrile polymer articles are rendered stable to heat by impregnating the article while it is in a swollen gel condition with an aqueous solution of a water soluble inorganic salt having a cation selected from the group consisting of alkaline earth metal ions, aluminum, tin, iron, copper, zirconium and lead ions followed by intimately contacting the article while still in the gel condition with an aqueous phosphoric acid solution.

---

This invention relates to improving the heat stability of acrylonitrile polymer products and particularly, to improving the heat stability of such products, especially fibers or filaments, that pass through a gel state during the manufacture thereof.

Acrylonitrile polymers are well accepted for the preparation of various fabricated shapes including films, foils, ribbons and the like and particularly for the preparation of synthetic fibers. Because of the relatively high melting temperatures of such polymers and their tendency to decompose before melting, melt extrusion or fabrication techniques are not adaptable for fabricating shaped articles from these polymers. Instead, fabrication from solutions of the polymers are most frequently employed, almost exclusively when acrylonitrile polymers are being extruded into fibers or filaments.

However, it is frequently observed that the fabricated articles, e.g., fibers, when extruded from solutions tend to be discolored or at least to be heat sensitive so that they subsequently discolor when exposed to elevated temperatures for any length of time. This seems to follow whether the polymers are dissolved in the known organic solvents for the polymers or the known aqueous saline solutions that are solvents for the polymers, although discoloration from the latter solvents may more frequently be noted. This tendency to discolor is often more pronounced and more frequently observed when the polymer is homopolymeric acrylonitrile. The reasons for this are not fully known but one possibility is that other monomers polymerized in the polymer chain may enhance initial whiteness and heat stability of the article fabricated therefrom.

It is the chief concern and primary object of this invention to provide a means for manufacturing shaped articles of acrylonitrile polymer compositions so as to impart to such shaped articles improved initial whiteness as well as improved resistance to heat discoloration (improved heat stability).

These as well as additional objects and associated advantages and benefits are achieved in and by the practice of the present invention which comprises providing a solution of a polymer of an ethylenically unsaturated monomeric material containing at least about 50 weight percent polymerized acrylonitrile, fabricating the solution into a shaped article of a relatively highly swollen or gel condition, and while the article is in such a swollen or gel condition, impregnating the article with a water soluble inorganic salt having a cation selected from the group consisting of an alkaline earth metal (e.g., calcium, magnesium, zinc, etc.), aluminum, tin, iron, copper, zirconium and lead, and then treating the impregnated gel article with an aqueous solution of phosphoric acid followed by irreversibly drying the treated article (i.e., collapsing the gel structure).

Thus, the present invention provides a means for preparing acrylonitrile polymer articles having highly improved and often excellent initial whiteness, being essentially free from coloration, and having excellent resistance to discoloration upon exposure to heat or elevated temperatures. The articles can be fabricated or shaped from conventional solutions of the polymers. Articles fabricated according to the present method, for example, fibers, which are frequently observed to have, in their freshly prepared condition, a yellowish coloration, are obtained having highly improved coloration and frequently having an excellent and highly acceptable white lustrous appearance. Additionally, if the polymeric articles are fabricated from solutions in a conventional manner and without the benefit of the present treatment, even if initially obtained with a good initial whiteness, it is often experienced that the articles will badly discolor when subsequently exposed to elevated temperatures. For instance, when such an article, e.g., a fiber, is exposed or contacted with heated elements at about 200° C. for 5 minutes the fiber turns a yellowish-orange color. This is significantly diminished if not prohibited when the method of the present invention is employed. Additionally, the practice of the invention provides articles not only having excellent resistance to heat effects but the result is of an unusually permanent nature. Frequently, additives or treatments designed to impart heat stability are somewhat transient with time, which may be caused by subsequent use and treatments. For instance in dye houses and textile mills and in home launderings, heat stabilizing additives may be rapidly or gradually leached from the fibers or their effectiveness may be otherwise hindered. By practice of the instant method the heat stabilizing bodies are firmly entrapped throughout the treated article.

Advantageously and beneficially, the inorganic salts that are employed are those derived from the indicated group of cations and are those of the water soluble or at least partially water soluble variety. While there are quite a number of salts that can be employed in the practice of the present invention, the choice is not unlimited. Many salts that are not encompassed by those presently indicated provide no beneficial results regards improving the heat stability of the acrylonitrile polymer compositions and articles derived therefrom. Frequently, such other salts may actually accelerate and accentuate heat degradation. Water solubility of the useful salts employed herein is desirous from the standpoint that most frequently the gel condition of the treated article is an aquagel and, hence, impregnation of the salt from an aqueous bath is most convenient and compatible. This same sort of convenience is carried through in the phosphoric acid treatment which is accomplished with an aqueous bath. Impregnation could be carried out in a solvent bath but little, if any, advantages are to be derived therefrom.

The types of water-soluble salts that have been found useful in practicing the present invention are those, as indicated, having a cation selected from the group consisting of alkaline earth metals such as calcium, magnesium, zinc, etc., aluminum, tin, iron, copper, zirconium and lead and a compatible anion so as to render the salt at least partially water soluble. Exemplary of some of the suitable salts are magnesium sulfate, calcium chloride, stannous chloride, aluminum chloride, zinc chloride and other halide derivatives of such cations, zirconium tetrachloride, zirconyl chloride, zirconium tetrabromide, zirconyl nitrate, etc.

Ordinarily, only small quantities of the inorganic salt need be incorporated in the gel article during the impregnation step, and for that matter, small quantities provide very beneficial results. Amounts of the salt ranging from about 0.001 to about 10 weight percent, based on article dry weight can be incorporated in the article. Preferably, smaller quantities are used since large amounts, although enhancing heat stability, may interfere with other desirable properties inherent in the article, and profitably, between about 0.1 to 2 weight percent of the salt is impregnated into the article, based on article dry weight.

To accomplish the desired level of impregnation a solution of the salt having any suitable concentration can be employed. Varying the time of exposure of the gel article in the salt impregnating bath and the concentration of the bath is the usual way to achieve the predetermined impregnation. Extremely dilute solutions up to the saturation concentration of the salt in the solution can be used. Normally solutions containing from about 0.5 to 5 weight percent or so are used to impregnate the gel article with the salt. Immersing the article in the salt solution is the most convenient way to impregnate the article. Padding is also a most useful adjuvant to assist in controlling the level of impregnation. The impregnation can be carried out batchwise or in a continuous manner, the latter being preferred when gel fibers are being treated.

After the gel article is impregnated with the desired amount of the indicated variety of salt, the article is treated with an aqueous phosphoric acid solution. While spraying, wiping or other applicating methods can be employed, preferably, immersing the impregnated gel article in the aqueous phosphoric acid solution is followed in the practice of the invention in order to assure intimate contacting of the impregnated salt with the acid solution. Usually the concentration of the phosphoric acid solution is not critical so long as it is sufficient to convert substantially all of the impregnated salt to a heat stabilizing ingredient having excellent permanency in the fiber or to effectuate whatever other mechanism that may come into play that provides the present excellent results. Generally a 0.5 to 10 weight percent phosphoric acid solution is employed. Of course, the amount of salt that is impregnated in the article will dictate somewhat the concentration of and time of treatment in the phosphoric acid solution.

It is essential in the practice of the invention that both the salt impregnation and phosphoric acid treatment be carried out on the article while it is in a gel or swollen condition, and advantageously in an aquagel condition. The treatment of the invention generally can be performed at any stage after fabrication of the gel article (but preferably after washing residual solvent from the article) so long as the gel structure is not collapsed such as happens when the article is irreversibly dried.

The invention is applicable to treating acrylonitrile polymer articles which are fabricated from normally solid acrylonitrile polymers that contain in the polymer molecule at least about 50 weight percent of polymerized acrylonitrile, and is especially applicable to treating fibers of such acrylonitrile polymers, in which case polymers containing at least about 80 weight percent polymerized acrylonitrile are preferred. Advantageously, such articles are fabricated from, and with fibers wet spun in and with systems that are adapted to utilize aqueous coagulating liquids in the spinning operation, such as systems wherein ethylene glycol, dimethylformamide, dimethylacetamide, dimethylsulfoxide, butyrolactone and the like or the various saline polyacrylonitrile-dissolving solvents are employed as spinning or fabricating solution solvents for the polymer and are also present in non-polymer dissolving quantities in the aqueous coagulating liquid used in the spin or coagulation bath.

The utile, known aqueous saline solvents for the various fiber-forming acrylonitrile polymers and poly-acrylonitrile include zinc chloride, the various thiocyanates such as calcium and sodium thiocyanate, lithium bromide, salt mixtures of the so-called "lyotropic" series, and others recognized by the art as has been disclosed, among other places, in U.S. Letters Patent Nos. 2,425,192, 2,648,592, 2,648,593, 2,648,646, 2,648,648, 2,648,649, and 2,949,435. Advantageously, aqueous zinc chloride solutions are used for the purpose.

Exemplary of some of the monomeric materials that may be employed with the acrylonitrile in the preparation of the acrylonitrile polymer and copolymer article and fiber-forming systems and treated in accordance with the practice of the present invention include allyl alcohol, vinyl acetate, acrylamide, methacrylamide, methyl acrylate, vinyl pyridine, ethylene sulfonic acid and its alkali metal salts, vinyl benzene sulfonic acid and its salts, 2-sulfo-ethylmethacrylate and its salts, vinyl lactams such as vinyl caprolactam and vinyl pyrrolidone, etc. and mixtures thereof.

As indicated, after acrylonitrile polymer articles and particularly fibers have been wet spun they are most frequently water washed or washed with an aqueous inert solution to remove any residual polymer solvent from the freshly formed filaments, thus forming an intermediate fiber product often referred to as a gel or aquagel filament.

The invention is also applicable for the treating of acrylonitrile polymer articles that are prepared by other than wet spinning or fabricating techniques that cause the article to pass through or can be caused to pass through a gel state. For example, fibers that are dry spun but have residual amounts of solvent that is replaced by water during washing and thus is preserved in a swollen gel condition.

Thoroughly washed acrylonitrile polymer aquagel fibers, incidentally, are frequently found to contain up to about 6 parts by weight of water (including residual extrinsic or exterior water associated therewith) for each part by weight of dry polymer therein. More often, washed acrylonitrile aquagel polymer fibers are found to contain from about 3 to 4 parts by weight of water for each part by weight of polymer. The exact content of water or other inert material in the gel is not especially critical, and, as mentioned, the important thing is that the gel condition exists at the time the present treating method is administered to the article.

When fibers are treated, the present invention can be carried out conveniently in standard spinning trains. That is, no major alterations to a conventional fiber-forming process need be undertaken. Because of the extreme speed at which the fibers can be impregnated and treated in practicing the present invention, the ordinary and commercially useful spinning speeds can be employed while simultaneously obtaining an excellent heat stable fiber.

In order to further illustrate the present invention, acrylonitrile polymer fibers consisting of about, in copolymerized form, 91.5 percent acrylonitrile, 7 percent methyl acrylate and 1.5 percent 2-sulfoethylmethacrylate were prepared by spinning a solution of the polymer dissolved in an aqueous about 60 weight percent zinc chloride solution into an aqueous zinc chloride coagulation bath. The coagulated gel filaments were withdrawn from the coagulation bath, washed essentially completely free of residual zinc chloride and hot stretched to orient the molecules thereof. The washed and stretched gel filaments were then passed through an aqueous, about one percent, solution of a metal salt to impregnate the gel filaments therewith. The impregnation was carried out in a continuous manner by passing the gel filaments through a bath containing a one percent solution of the soluble salt which was at about 30° C. The residence time of the gel filaments in the bath was about five seconds. A portion of the so-treated filaments was then passed through an aqueous bath containing five precent phosphoric acid at 30° C. Following the impregnation and phosphoric acid treatment (if this latter treatment was performed) the gel filaments were ultimately irreversibly dried six to seven minutes at 125° C. to characteristically hydrophobic textile fibers. A control sample was also run which was not impregnated with a salt nor treated with phosphoric acid.

Samples of each of the fibers were cut into short staple lengths and formed into an aqueous slurry in a Waring Blendor. The slurry was poured through a filter to form a pad of the fibers which was dried leaving about a 3/16 inch thick pad of the fibers. The pad was then pressed between two metal plates of an AATCC Scorch Tester at 250° C. for five minutes. The measuring head of a Photovolt Corporation Reflectometer fitted with a green tristimulus filter was first placed on the unscorched portion of the pad and the instrument adjusted to a reflectance reading of 100; a reflectance reading was then taken on the scorched portion of the fiber pad. The difference in reflectance is a measure of the color formation due to heat. The recorded values are the number of units below the unscorched value of 100. The smaller the recorded value, the less change from the unscorched reading of 100, and hence the better the heat stability of the fiber. The results are set forth in the following table.

| Metal salt | Heat stability reading | |
|---|---|---|
| | Impregnated sample | Impregnated sample treated with 5% $H_3PO_4$ |
| Control (heat stability reading of 60). | | |
| Magnesium sulfate | 56 | 15 |
| Calcium chloride | 46 | 25 |
| Stannous chloride | 21 | 19 |
| Aluminum chloride | 22 | 21 |
| Zinc chloride | 73 | 27 |

Commensurate excellent results to the foregoing are achieved by practice of the present invention when other salts within the scope of the invention are employed.

What is claimed is:

1. The method for preparing an article of an acrylonitrile polymer containing at least about 50 weight percent polymerized acrylonitrile in the polymer molecule having improved heat stability comprising (a) impregnating the article while it is in a never-dried gel condition with an aqueous solution of a water soluble inorganic salt having a cation selected from the group consisting of alkaline earth metal ions, aluminum, tin, iron, copper, zirconium and lead ions and (b) then treating the so impregnated gel article with an aqueous phosphoric acid solution to assume intimate contacting of the impregnated salt with the acid solution.

2. The method of claim 1, wherein said article is a filamentary article of an acrylonitrile polymer containing at least about 80 weight percent polymerized acrylonitrile in the polymer molecule.

3. The method of claim 1, wherein said article is impregnated until it contains incorporated therein from about 0.1 to about 2 weight percent of said inorganic salt.

4. The method of claim 1, wherein said phosphoric acid solution contains from about 0.5 to about 5 weight percent phosphoric acid.

5. The method of claim 1, wherein said inorganic salt is magnesium sulfate.

6. The method of claim 1, wherein said inorganic salt is calcium chloride.

7. The method of claim 1, wherein said inorganic salt is stannous chloride.

8. The method of claim 1, wherein said inorganic salt is aluminum chloride.

9. The method for preparing an acrylonitrile polymer fiber having improved heat stability comprising
   (a) spinning a solution of a polymer of an ethylenically unsaturated monomeric material containing at least about 80 weight percent polymerized acrylonitrile in the polymer molecule dissolved in a solvent therefor into an aqueous coagulation bath;
   (b) withdrawing coagulated gel filament from said coagulation bath and washing said gel filament substantially free of any residual polymer solvent;
   (c) impregnating said washed gel filament with an aqueous solution of a water soluble inorganic salt having a cation selected from the group consisting of alkaline earth metal ions, aluminum, tin, iron, copper, zirconium and lead ions;
   (d) treating the impregnated gel filament with an aqueous phosphoric acid solution to assume intimate contacting of the impregnated salt with the acid solution; and
   (e) subsequently, irreversibly drying said gel filament to a characteristically hydrophobic textile fiber.

10. The method of claim 9, wherein said filament is impregnated until it contains incorporated therein from about 0.1 to about 2 weight percent of said inorganic salt.

11. The method of claim 9, wherein said phosphoric acid solution contains from about 0.5 to about 5 weight percent phosphoric acid.

12. The method of claim 9, wherein said inorganic salt is calcium chloride.

13. The method of claim 9, wherein said inorganic salt is stannous chloride.

14. The method of claim 9, wherein said inorganic salt is aluminum chloride.

15. The method of claim 9, wherein said solvent is an aqueous inorganic saline solution.

16. The method of claim 15, wherein said aqueous inorganic saline solution is at least about 55 weight percent zinc chloride solution.

17. A fiber having improved heat stability comprised of a polymer of a monoethylenically unsaturated monomeric material containing at least 80 weight percent polymerized acrylonitrile in the polymer molecule having incorporated therein the reaction product of phosphoric acid and a water soluble inorganic salt having a cation selected from the group consisting of alkaline earth metal ions, aluminum, tin, iron, copper, zirconium and lead ions, said reaction product having been developed in situ in said fiber by impregnating said fiber while it is in a never dried gel condition with said salt followed by intimately contacting said never dried gel fiber with an aqueous solution of said acid.

References Cited

UNITED STATES PATENTS

| | | | |
|---|---|---|---|
| 3,354,113 | 11/1967 | Cheape et al. | 260—45.7 XR |
| 2,813,845 | 11/1957 | Wesp et al. | 260—45.75 |
| 2,841,569 | 7/1958 | Rugg et al. | 260—45.7 |
| 2,946,760 | 7/1960 | DeWitt et al. | 260—29.6 |

DONALD E. CZAJA, *Primary Examiner.*

M. J. WELSH, *Assistant Examiner.*